US006977938B2

(12) United States Patent
Alriksson et al.

(10) Patent No.: US 6,977,938 B2
(45) Date of Patent: Dec. 20, 2005

(54) MOBILE IP FOR MOBILE AD HOC NETWORKS

(75) Inventors: Fredrik Alriksson, Johanneshov (SE); Ulf Jönsson, Skärholmen (SE); Kevin Purser, Slidell, LA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 901 days.

(21) Appl. No.: 09/739,700

(22) Filed: Dec. 20, 2000

(65) Prior Publication Data

US 2001/0024443 A1 Sep. 27, 2001

(30) Foreign Application Priority Data

Dec. 20, 1999 (EP) ................................. 99850210

(51) Int. Cl.[7] ........................ H04L 12/28; H04L 12/66; H04M 11/00; H04Q 7/00

(52) U.S. Cl. ...................... 370/401; 370/329; 370/352; 455/403

(58) Field of Search ........................ 370/227, 389–392, 370/395, 401–469, 238–352; 709/227, 224–238, 709/245, 317, 206; 455/403–433, 445, 466, 455/435

(56) References Cited

U.S. PATENT DOCUMENTS

| | | | | |
|---|---|---|---|---|
| 5,959,974 | A * | 9/1999 | Badt et al. | 370/233 |
| 5,987,011 | A * | 11/1999 | Toh | 370/331 |
| 6,445,922 | B1 * | 9/2002 | Hiller et al. | 455/433 |
| 6,452,920 | B1 * | 9/2002 | Comstock | 370/349 |
| 6,466,571 | B1 * | 10/2002 | Dynarski et al. | 370/352 |
| 6,477,644 | B1 * | 11/2002 | Turunen | 713/161 |
| 6,484,211 | B2 * | 11/2002 | Turunen | 709/245 |
| 6,487,406 | B1 * | 11/2002 | Chang et al. | 455/422.1 |
| 6,501,767 | B1 * | 12/2002 | Inoue et al. | 370/465 |
| 6,532,217 | B1 * | 3/2003 | Alkhatib et al. | 370/252 |
| 6,535,493 | B1 * | 3/2003 | Lee et al. | 370/329 |
| 6,567,664 | B1 * | 5/2003 | Bergenwall et al. | 455/403 |
| 6,678,252 | B1 * | 1/2004 | Cansever | 370/253 |
| 6,697,355 | B1 * | 2/2004 | Lim | 370/352 |
| 6,707,809 | B1 * | 3/2004 | Warrier et al. | 370/351 |

(Continued)

FOREIGN PATENT DOCUMENTS

WO 99/46890 A1 9/1999

(Continued)

OTHER PUBLICATIONS

Johnson et al, “Protocols for Adaptive Wireless and Mobile Networking”, IEEE Personal Communications, U.S. IEEE Communications Society, vol. 3, No. 1, Feb. 1, 1996, pp. 34-42.

(Continued)

*Primary Examiner*—Man U. Phan
(74) *Attorney, Agent, or Firm*—Nixon & Vanderhye, P.C.

(57) ABSTRACT

In a wireless or mobile ad hoc network the routing interworks with the ordinary Internet routing using the Mobile IP. Mobile IP foreign agents are used as gateways between the ad hoc network and the Internet. The nodes in the ad hoc network use their home addresses for all communication and register with a foreign agent in the network. To send packets to hosts on the Internet either tunnelling or proxying is used. To receive packets from the Internet the packets are routed to the foreign agent using the Mobile IP. The foreign agent then routes the packets to the destination in the ad hoc network. Since the ordinary Mobile IP requires link-layer connectivity between the foreign agent and a visiting node which is not guaranteed on the ad hoc network, modifications are accordingly made to the procedures of the Mobile IP.

26 Claims, 4 Drawing Sheets

U.S. PATENT DOCUMENTS

| | | | | |
|---|---|---|---|---|
| 6,711,147 | B1 * | 3/2004 | Barnes et al. | 370/338 |
| 6,738,362 | B1 * | 5/2004 | Xu et al. | 370/329 |
| 6,795,857 | B1 * | 9/2004 | Leung et al. | 709/224 |
| 2002/0186688 | A1 * | 12/2002 | Inoue et al. | 370/352 |

FOREIGN PATENT DOCUMENTS

| | | | |
|---|---|---|---|
| WO | 99/59363 | A1 | 11/1999 |

OTHER PUBLICATIONS

Perkins, "Mobile IP", IEEE Communications Magazine, U.S., IEEE Service Center, Piscataway, NJ, vol. 35, No. 5, May 1, 1997, pp. 84-86, 91-99.

International Search Report mailed Apr. 2, 2001 in corresponding PCT application No. PCT/SE00/02614.

Perkins et al, "Ad-hoc On-Demand Distance Vector Routing", Proceedings of the 2nd IEEE Workshop on Mobile Computing Systems and Applications, New Orleans, LA, Feb. 1999, pp. 90-100.

Broch et al, "Supporting Hierarchy and Heterigeneous Interfaces in Multi-hop Wireless Ad Hoc Networks", Proceedings Fourth International Symposium on Parallel Architectures, Jun. 23-25, 1999.

Perkins, "Mobile Networking on the Internet", Mobile Networks and Applications 3, 1998, pp. 319-334.

* cited by examiner

Prior Art, Ordinary Mobile IP, Requires link-layer connectivity

Prior Art, Mobile IP combined with Ad Hoc network, Requires fixed protocol

Present Invention, separates Mobile IP and routing, allows flexible routing protocols and doesn't require link-layer connectivity

MOBILE IP FOR MOBILE AD HOC NETWORKS

The present invention relates to forming wireless or mobile ad hoc networks and how routing in such ad hoc networks can interwork with ordinary Internet routing. More particularly the invention relates to methods of enabling the Mobile IP in such ad hoc networks.

BACKGROUND

In areas having little or no infrastructure for telecommunication, and in areas where telecommunication using the infrastructure is too expensive, users of wireless mobile stations may still be able to communicate with each other through the formation of an ad hoc network. Generally, in such a network each mobile station operates not only as a host but also as a router, forwarding packets to other mobile stations in the ad hoc network that may not be within direct wireless transmission range of each other Each node uses an ad hoc routing protocol that allows it to discover "multi-hop" paths through the network formed to any other node. Mobile stations in these networks establish routing among themselves to form their own network "on the fly".

Possible uses for such networks, called Mobile Ad Hoc Networks (MANETs), include e.g. business associates sharing information during a meeting, soldiers relaying information on the battlefield, and emergency relief personnel who must quickly set up a network to coordinate efforts after a hurricane or an earthquake. A particular application which will probably introduce ad hoc networking to the mass market involves the use of devices working according to the standard Bluetooth, a standard for allowing low-power short range radio communication and initially intended as a means to replace cables.

Such mobile ad hoc networks have been studied for some time, but most work has been concentrated on stand-alone ad hoc networks. Several proposed routing protocols use reactive routing, also known as on-demand routing as opposed to ordinary Internet Protocol ("IP") routing, which uses proactive routing. Proactive routing means that the routing protocol constantly tries to keep track of the routes in the network so that when a host needs to send a datagram a route to the recipient is known beforehand. Reactive routing means that the routing protocol only operates when there are datagrams to deliver in the network, otherwise it does nothing.

There are two basic problems with the mobile ad hoc networks:

How can someone connect an ad hoc network that uses on-demand routing to the Internet?

How can Mobile IP services be connected in such an ad hoc network?

Addressing in the Internet is hierarchical with IP addresses divided into a network ID and a host ID. All hosts connected to the same network use the same network ID. In this way, each IP address is mapped to a physical location that can be derived by looking at the network ID of the IP address. This also means that an Internet host does not have to keep track of routes to every other Internet host. Instead, routing information can be aggregated; one entry in the routing table can handle all hosts that share the same network ID. To make better use of the address space, yet another level of hierarchy is used: a network can be divided into subnetworks. The host ID is then divided into a subnet ID and a host ID.

The number of networks in the Internet is quite substantial and it is not always necessary to keep track of them all, since they only have limited interconnections. Because most networks are leaf networks, default routes are widely used. In short, IP routing works as follows:

1. Look for an entry in the routing table that matches the complete destination IP address. If found, use that route.
2. Look for an entry in the routing table that matches the network ID of the destination IP address. If found, use that route.
3. Look for a default entry in the routing table. If found use that route, otherwise consider the destination unreachable.

The capability of using one route to a network instead of having one route per host and using a default route is two powerful features of IP routing.

If someone wants an ad hoc network to be routable from the Internet like any other Internet network, someone must assign a network ID thereto and ensure that the nodes in the ad hoc network use it. If such a method is used, the IP multihop communication within the ad hoc network is what distinguishes it from regular Internet networks. Nodes in the ad hoc network cannot expect to have link-layer connectivity with all other nodes in the ad hoc network as in regular Internet networks. In order to reach the default gateway between the ad hoc network and the fixed Internet, nodes must use IP layer routing.

The traditional view of ad hoc networks is as autonomous systems of mobile nodes using IP. As such, the ad hoc network should be capable of operating without any centralized configuration. Also, from an ad hoc point of view, any set of nodes should be capable of forming an ad hoc network regardless of the addresses which they use and without having to use any particular network ID. This implies that one can no longer decide if a node belongs to that particular network simply by looking at the network ID.

In the following the focus will be on what happens when such an autonomous ad hoc network is connected to the Internet and the nodes within the ad hoc network wish to communicate with other Internet hosts.

Most work concerning routing in ad hoc networks has been concentrated on stand-alone ad hoc networks. The IP mobility that is provided in earlier ad hoc networks was limited to the ad hoc network as such. To allow roaming between different networks the Mobile IP protocol was developed, separately from ad hoc networking. In a stand-alone ad hoc network, without the hierarchy that the network ID creates, there is no meaning in having a default route since either the recipient is reachable within the ad hoc network or it is not reachable at all. As a result thereof, routing in ad hoc networks is typically performed using host routes only.

This is the case for both Ad Hoc On-demand Distance Vector Routing ("AODV") and Dynamic Source Routing ("DSR") for example, which use neither network nor default routes. In AODV there are no periodic changes of the routing tables. Routes are only set up when two nodes want to communicate with each other, and only nodes that are connected in the path between the two end nodes keep information about the route. In the AODV method: (a) discovery packets are broadcast as sparingly as possible; (b) is distinguished between local connectivity management and general topology maintenance; and (c) information is propagated about changes in local connectivity to neighbouring nodes which are likely to need that information. One key aspect of AODV is that each node maintains a routing table containing one entry for each destination with which the node communicates itself or to or from which the node forwards data to on behalf of some other node.

Another type of known on-demand routing is DSR. The feature that makes DSR stand out from other routing protocols of Mobile Ad Hoc Networks is that DSR uses strict source routing. Strict source routing means that the source determines the complete sequence of hops that each packet should traverse. The list of hops is then included in the header of each packet. One obvious disadvantage thereof is the source routing overhead which every packet has to carry. Loose source routing is a method according to which a packet must be routed via some specific nodes, e.g. a foreign agent in this case, but otherwise can choose its own way to the destination.

In DSR two basic mechanisms are used, route discovery and route maintenance. Route maintenance is used for handling link breakages and is carried out whenever a route is used to send packets. Route discovery is used to find a route from the source to the destination. The network is flooded with route request messages. Each node in the network adds its address to a route request received in the node and then forwards it. If a route exists to the destination the route request will find its way to the destination. All that the destination node has to do is unicast a route reply back to the source using the route listed in the route request. Each node in the network maintains a route memory in which it stores the routes that it has learned. Route discovery is only used when an appropriate route cannot be found in the route memory.

In on-demand routing methods like DSR and AODV the routing tables are usually searched in the following manner:

1. Look for an entry in the routing table that matches the complete destination IP address. If found, use that route.
2. Try to find a host route within the ad hoc network by using the route discovery mechanisms. If found, use that route, otherwise consider the destination unreachable.

Host routing by nodes in an ad hoc network as described above should be feasible for destinations on the fixed Internet when an ad hoc network is connected to the fixed Internet since routing information is only kept for destinations with which an ad hoc node is currently communicating. What is lacking in these procedures is a mechanism for propagating routing information from the fixed Internet to the ad hoc network, i.e. how nodes in the ad hoc network should treat network and default routes.

To be reachable from the rest of the Internet, a node in an ad hoc network needs an IP address that allows the ad hoc node to be routable from the rest of the Internet. Since the ad hoc network is connected to the Internet there must be at least one node that resides on the border between the ad hoc network and the rest of the Internet. This node will be referred to as the Internet gateway. The Internet gateway must have at least one IP address that can be used for communication with the rest of the Internet. How can the nodes in the ad hoc network make use of that fact?

Mobile IP is a proposed standard protocol for location independent routing. It allows a mobile node to have seamless, untethered access to the Internet while roaming and is based on the Internet Protocol by making mobility transparent to applications and higher level protocols like TCP and UDP. The main technical obstacle that had to be overcome to support mobility was the way in which the IP addresses are used. Unicast Internet traffic is routed to the location specified by the destination address in the IP header. The address specifies a network address and hence traffic is sent to this network.

Unfortunately this does not work for mobile nodes since a mobile node wants to have the same address independently of its location without the sender having to keep track of the place where the mobile node is located. Mobile IP solved this problem by allowing the mobile node to use two IP addresses, one for identification by e.g. TCP, and one for routing to the current location of the node.

In order to maintain existing transport layer connections every mobile node is assigned a static home address. This home address allows the mobile node to always be capable of receiving data in the same way as it receives data in its home network. When the mobile node is attached to a network different from its home network, called a foreign network, it uses a care-of address. The care-of address is an IP address valid in the foreign network that the mobile node is visiting. Whenever a mobile node moves from one network to another it has to change to a new care-of address that is valid in the new network.

To be capable of receiving datagrams while visiting a foreign network the mobile node has to register its current care-of address with its home agent. To do this, the mobile node usually has to register through a foreign agent FA located in the foreign network. The process of detecting a foreign agent is quite similar to that used by Internet nodes to detect routers which support the Internet Control Message Protocol (ICMP). Each mobility agent periodically broadcasts agent advertisements to its directly attached subnetworks to advertise its existence. The mobile node listens for these advertisements in order to select a mobility agent, i.e. a foreign agent, through which the node can register with its home agent.

When the node is successfully registered with the home agent, every datagram sent to the home address of the mobile node is received by the home agent and forwarded to the care-of address, e.g. the foreign agent, that then forwards it to the mobile node. The forwarding is performed using a method called tunnelling. When the home agent receives a datagram destined for the mobile node, it encapsulates the original datagram within a new IP packet that contains the care-of address of the mobile node as its destination address. This new IP packet is then routed to the care-of address where it is then decapsulated. The decapsulated packet is now said to have been tunnelled. If the care-of address is the care-of address of a foreign agent the foreign agent forwards the decapsulated datagram to the mobile node.

The procedure used by ordinary Mobile IP with foreign agent care-of addresses assumes link-layer connectivity between the foreign agent and the visiting node In summary, the communication between foreign agents and visiting nodes is as follows:

1. Foreign agents broadcast agent advertisements periodically, once per second. These advertisements are used by visiting nodes to
   detect the presence of a foreign agent
   discover the presence of new foreign agents,
   decide when it has moved, and
   detect when a foreign agent is no longer reachable.
2. Visiting nodes may broadcast agent solicitations to detect foreign agents. A foreign agent that receives an agent solicitation must respond by sending a unicast agent advertisement.
3. When a visiting node has received a valid agent advertisement from a foreign agent it may register with that foreign agent.

IP broadcast messages are used frequently for the operation of ordinary Mobile IP. In ad hoc networks, such broadcast messages are much more costly, since they have to traverse multiple hops and must be retransmitted by every node within the ad hoc network. Thus, it would be desirable to reduce the number of broadcast messages if possible.

Some methods already exist which attempt to apply Mobile IP to ad hoc networks. In "Ad Hoc Networking with Mobile IP", Proceedings of 2nd European Personal Mobile Communication Conference, September 1997, a solution for using Mobile IP on top of a proactive routing protocol is described. The routing protocol that is used is said to be "a modified RIP", and is very similar to Destination Sequenced Distance Vector Routing ("DSDV"). It seems fairly straightforward to use the proposed method for a proactive routing protocol like DSDV, but it is not viable for a reactive, on-demand, routing protocol since it relies on periodically transmitted control packets of the routing protocol for spreading Agent Advertisements. In an on-demand routing protocol, there is no such thing as periodically transmitted control packets.

One point made in the cited "Ad Hoc Networking" article is that both Mobile IP and the ad hoc routing protocol use routing tables. To coordinate the two routing tables, a route manager is introduced. Instead of modifying the routing table directly, both Mobile IP and the ad hoc routing protocol send their route manipulation requests to the route manager. It is then up to the route manager to determined those manipulations that should be carried out.

For combining Mobile IP with ad hoc networks using on-demand routing protocols, no detailed solution has been disclosed. In "Supporting Hierarchy and Heterogeneous Interfaces in Multi-Hop Wireless Ad Hoc Networks", Proceedings of the Workshop on Mobile Computing, IEEE, June 1999, an initial design of an addressing architecture is described which, among other things, could be used to provide Mobile IP support within an ad hoc network. The section that covers interworking between Mobile IP and ad hoc networking is, however, not very elaborate. Additionally, it assumes that DSR is used as the routing protocol in the ad hoc network.

However the procedure of "Supporting Hierarchy" according to the cited article only considers one foreign agent and one mobile node only. The idea comprises that the mobile node piggybacks a Mobile IP Agent Solicitation on a Route Request targeting the IP limited broadcast address (255.255.255.255). The limited broadcast is used to allow the Solicitation to propagate over multiple hops through the ad hoc network, but not be forwarded to the Internet by gateways. When the foreign agent receives the Solicitation, it will unicast an Agent Advertisement in reply. Once the Agent Advertisement reaches the mobile node, the mobile node can register with the foreign agent and the ordinary triangle routing of Mobile IP can begin.

A basic problem when using Mobile IP in a Mobile Ad Hoc Network is that link-layer connectivity between the foreign agent and the mobile node cannot be assumed. In the first solution disclosed in the cited "Ad Hoc Networking" on-demand routing is not used and is thus not applicable.

The shortcomings of the second solution described above in the cited article "Supporting Hierarchy" are:

1. It assumes that DSR is used.
2. There is no movement detection or handoff support.
3. It uses a special addressing scheme with interface index.

Accordingly, there exists a need for a mobile ad hoc network which can communicate with the Internet using Mobile IP foreign agents as gateways which uses on-demand routing but does not require a specific ad hoc routing protocol used in the ad hoc network, nor link-layer connectivity between foreign agent and visiting node, and allows movement detection and handoff support.

SUMMARY

It is an object of the present invention to provide method of communicating information between ad hoc wireless networks and the Internet.

It is another object of the invention to provide a method of routing in mobile ad hoc networks that can interwork with ordinary Internet routing.

It is another object of the invention to provide a method of enabling the Mobile IP in mobile ad hoc networks.

Some problems not addressed in the "Ad Hoc Networking" and" Supporting Hierarchy" articles cited above comprise:

What happens if there are several foreign agents to choose from?

How can a mobile node detect that it has moved?

How are hand-offs handled?

These problems can be reduced using the methods of the invention.

Hence, there still exist disadvantages in the current methods of allowing communication between mobile ad hoc networks and the Internet. More specifically, there are no current solutions that allow a mobile ad hoc network to communicate with the Internet using Mobile IP foreign agents as gateways in which mobile ad hoc network on-demand routing is used but which does not require a specific ad hoc routing protocol, nor link-layer connectivity between a foreign agent and a visiting node, and allows movement detection and handoff support.

Accordingly, it is an object of the present invention to provide a mobile ad hoc network, which can alleviate these problems.

Generally, a Mobile IP Mobile Ad Hoc Network ("MIP-MANET") as will be described hereinafter achieves this and other objects. The basic idea used when designing the Mobile IP Mobile Ad Hoc Network can be summarized as:

1. Use Mobile IP foreign agents as Internet gateways.
2. Nodes in the ad hoc network that want Internet access use their home address for all communication and register with a foreign agent.
3. To send packets to hosts on the Internet: incorporate default routes and network routes into the routing method used by the Mobile Ad Hoc Network by using either tunnelling or proxying:

a) Tunnel packets to the foreign agent with which a node is registered. If it cannot be decided if the destination is located within the ad hoc network by looking at the IP address; search for the node within the ad hoc network before tunnelling the packet.

b) Let the Internet gateway use proxy route replies to respond to route requests.

4. To receive packets from hosts on the Internet: The packets are routed to the foreign agent by ordinary Mobile IP, The foreign agent can then deliver the packets to the node in the ad hoc network.

Also some adjustments to the method according to the Mobile IP can be used within ad hoc networks. Since link-layer connectivity between a foreign agent and a visiting node cannot be expected within an ad hoc network some modifications must be made to the communication between the foreign agent and the visiting node.

1. Agent advertisements can be broadcast in response to agent solicitations, instead of unicast as specified in RFC2002. This allows the nodes in the ad hoc network to cooperate to minimize the number of solicitations that are broadcast.

2. Instead of broadcasting agent advertisements periodically, they can be unicast periodically to registered nodes only.
3. Nodes in the ad hoc network can store agent advertisements and reply to agent solicitations by sending stored advertisements.

One key difference between the method described herein and the prior art, in addition to the other differences discussed above, is that ordinary Mobile IP keeps the Mobile protocol separate from the routing protocol, as illustrated in FIG. 1*a*. However, the ordinary Mobile IP is not applicable to ad hoc networks because it depends on link-layer connectivity. On the other hand, prior solutions, which applied Mobile IP to ad hoc networks, have combined Mobile IP with the routing protocol, as illustrated in FIG. 1*b*. This limits the flexibility of the system, in addition to limiting it to only one routing protocol. The method disclosed herein, as illustrated in FIG. 1*c*, splits the functionality of the Mobile IP and the routing protocol, as is made in the ordinary Mobile IP, but allows it to work in combination with ad hoc networks.

Some merits of the method described herein include the following:

The method allows interworking between mobile ad hoc networks and the Internet, having no special requirements on ad hoc nodes that do not want to communicate with the Internet and that may use arbitrary addresses. The only requirement regarding addresses is that nodes that want to communicate with the Internet must use an address that is routable from the Internet.

The method as described herein will also allow Mobile IP services in mobile ad hoc networks, including handoffs between multiple foreign agents. In addition, the use of multiple gateways with proxying will reduce the possibility of bottlenecks for data flow out of the ad hoc network. Moreover, the use of a check for an external destination before sending a proxy reply gives an accurate representation of the total round trip transmission time for a message sent to such a destination.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1A:
FIGS. 1*a*, 1*b* and 1*c* are diagrams illustrating the relationship between Mobile IP and Routing protocols according to two prior art methods and according to a method as described herein, respectively.
Figure 1B:
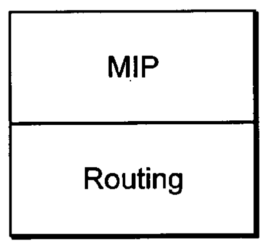
Figure 1C:
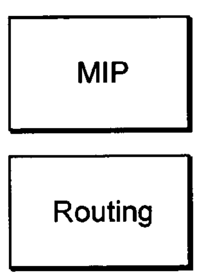

The method and ad hoc network to be described hereinafter can be divided in many small parts. The basic goal is to provide a mobile ad hoc network. In the method and ad hoc network Mobile IP foreign agents are used as Internet gateways between an ad hoc network and the Internet. The mobile nodes in the ad hoc network that want Internet access use their home addresses for all communication with and when registering with a foreign agent connected at the border between the ad hoc network and the Internet and having link-layer connectivity with the Internet and with the mobile nodes in the ad hoc network.

Aspects of the metbod and ad hoc network include tunnelling and/or proxying for sending packets to hosts connected to the Internet. Default routes and network routes are incorporated into routing in a Mobile Ad Hoc Network by either tunnelling or proxying:

a) Tunnel packets to the foreign agent with which the node is registered. If it cannot be decided if the destination is located within the ad hoc network by looking at the IP address: search for the node within the ad hoc network before tunnelling the packet.
b) Let the Internet gateway use proxy route replies to respond to route requests.

To receive packets from hosts connect to the Internet the packets are routed to the foreign agent using the ordinary Mobile IP. The foreign agent can then deliver the packets to the node in the ad hoc network.

In addition, since link-layer connectivity cannot be expected in the ad hoc network, certain changes are made to the procedures according to the Mobile IP. These include the following:

1. Agent advertisements can be broadcast in response to agent solicitations, instead of unicast as specified in RFC2002. This allows the nodes in the ad hoc network to cooperate to minimize the number of solicitations that are broadcast.
2. Instead of broadcasting agent advertisements periodically, they can be unicast periodically to registered nodes only.
3. Nodes in the ad hoc network can store agent advertisements and reply to agent solicitations with stored advertisements.

The methods of tunnelling and proxying and the changes to the Mobile IP needed for ad hoc networks will be described in more detail hereinafter.

In order to reach the Internet from a Mobile Ad Hoc Network using host routing, as known in the art, it should still be possible in those cases where on-demand routing is used in ad hoc networks with a network ID assigned to it, since the nodes of the ad hoc network could probably store default routes and network routes in their routing table and use almost the same kind of look-up mechanism that is used in ordinary routing according to the IP. However, it is much more flexible than in ad hoc networks operating without network IDs. In that case it cannot be decided whether a destination is located within the ad hoc network or not, by simply looking at the network ID of the destination as described above. It then becomes necessary to look for the node in the ad hoc network before it is decided if it is located within the ad hoc network or not.

One way of distributing routing information from the fixed Internet into the ad hoc network is to let the Internet gateways use proxy route replies. This will require additional semantics in the routing protocol but will enable multiple gateways equally supporting data flow from an ad hoc network to the Internet to be utilized. This mechanism involving added semantics and proxy replies is hereinafter referred to as proxying, which would allow any gateway to participate in the route discovery process.

Proxy route replies are introduced in the DSR protocol. There they are not different from normal route replies, but since DSR records the entire route during the discovery process a node originally sending a route request can see that the node which originally sent the route reply is a gateway by looking at its gateway interface index. For routing protocols like AODV that keep information about routes on a distributed hop-by-hop basis it is necessary to let the intermediate nodes in the discovery process know alternate routes, otherwise they would be unusable.

Although the semantics according to the method described herein have been developed for a particular routing protocol the concept can be applied to other routing protocols. The semantics added within the node acting as a gateway when receiving a route request are as follows.

1. Forward the request, in case where the destination is connected behind the gateway, i.e. in the ad hoc network;
2. Send a check to the external destination, e.g. an ICMP ECHO_REQUEST;
3. After receiving a positive indication, e.g. an ICMP ECHO_RESPONSE, from the destination, send a proxy route reply; and
4. Add a route table entry for the external destination with a sequence number at least equal to the sequence number in the route request.

Figure 2:
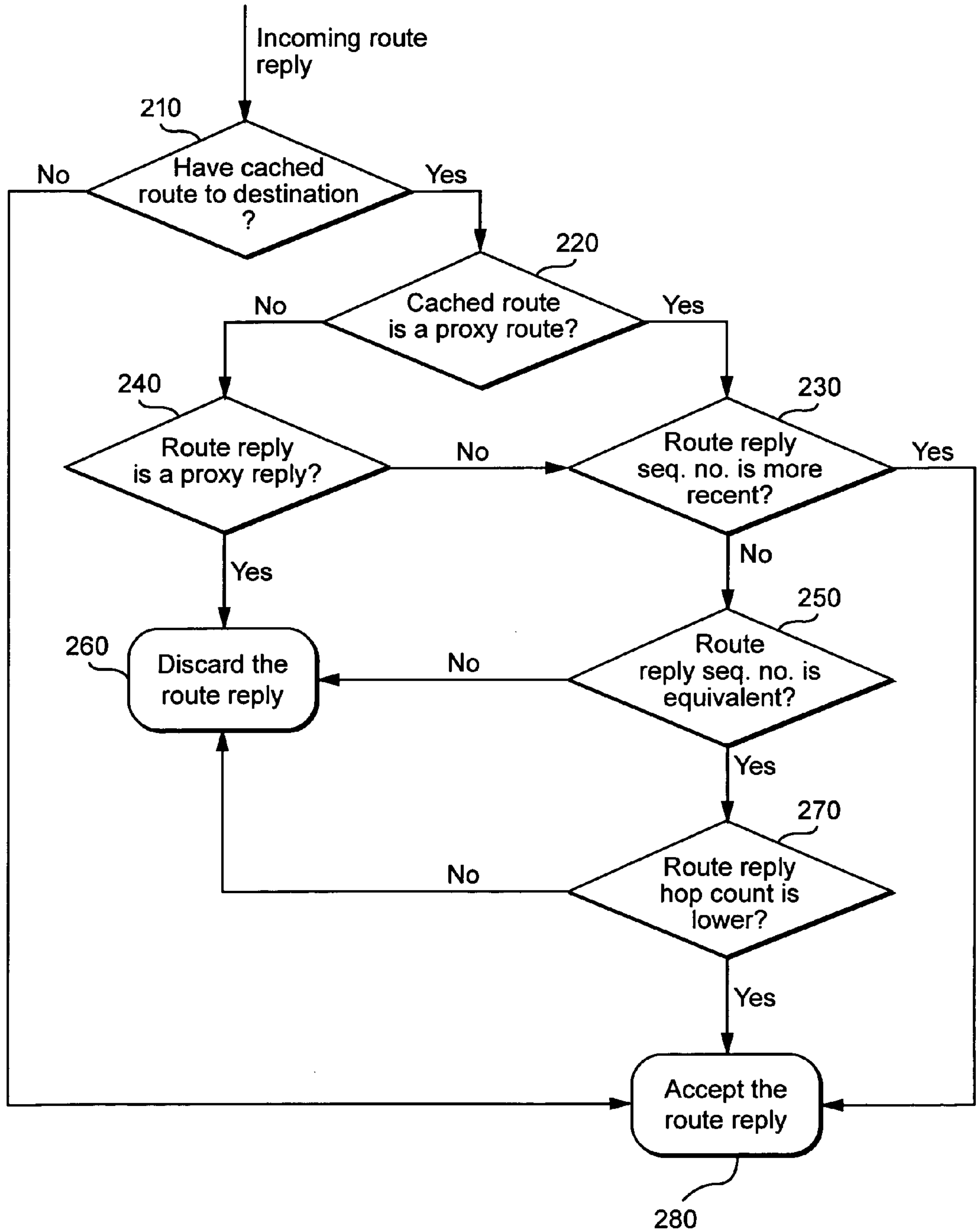
FIG. 2 is a flowchart illustrating steps executed in procedures in nodes receiving route replies.

When a mobile node initiates a route discovery, in the case where multiple gateways exist in the ad hoc network, there is a possibility for a node and also for intermediate nodes to receive a normal route reply and potentially many proxy route replies, one from each gateway connected in the ad hoc network. This introduces the need for additional conditions for accepting (and forwarding if necessary) a reply. After a node has received a route reply it initiates a route discovering procedure, see the flowchart of FIG. 2 in which the steps executed in the route discovering procedure are illustrated. In a first block 210 is determined whether a route is stored in a memory of the node to the particular destination with which the node tries to establish contact. If such a route is stored in the memory, it is determined in a block 220 whether this route stored in the memory is a proxy route. If the route to the destination is not stored in the memory, the route reply is accepted in a block 280.

If it is determined in the block 220 that the route stored in the memory is a proxy route it is determined in a block 230 whether the route reply sequence number is more recent than the stored route. If it is more recent, the route reply is accepted in the block 280. In the case where it is determined in the block 220 that the stored route is not a proxy route it is determined in a block 240 whether the route reply is a proxy reply. If it is determined to be a proxy reply the proxy reply is discarded in a block 260. If it is determined in the block 240 that is not a proxy reply the block 230 is executed in which it is determined whether the route reply sequence number is more recent. In the case where it is determined in the block 230 that the route reply sequence is not more recent it is determined in a block 250 whether the route reply sequence number is equivalent to the stored route. If it is not equivalent the route reply 260 is discarded in the block 260. If it is determined in the block 250 that the route reply is equivalent to the stored route it is determined in a block 270 whether the hop count of the route reply is lower than that of the stored route. If it is not lower the block 206 is executed in which the route reply is discarded. If it is determined in the block 260 that the hop count of the route reply is lower than the hop count of the equivalent stored route, the route reply 280 is accepted in the block 280.

Figure 3:
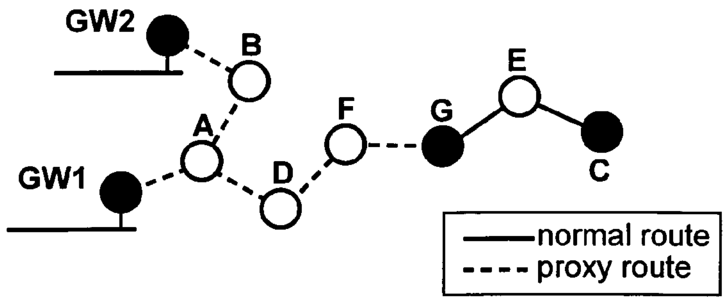
FIG. 3 is a diagram of a Mobile IP Mobile Ad Hoc Network illustrating a situation in which a node attempts to contact another node in the network.

Nodes that receive a proxy route reply will stored that route as being the only route to a particular destination if no normal route replies reach the node. In the schematic picture of FIG. 3 a node G initiates a route discovery process for node C, which creates three routes in the ad hoc network, two of which involve a gateway GW1, GW2 and a third one of which routes directly to the destination. Since the destination actually is connected in the ad hoc network, the proxy routes should not be used, and thus the intermediate nodes A, B, D and F have stored an incorrect route to the destination.

Under these circumstances, nodes which replace a proxy route with either a better proxy route, e.g. node A replacing a proxy route through node B with a proxy route through the gateway GW1, or a normal route, e.g. node G replacing proxy routes from node F with a normal route through node E, send a form of route error message to the intermediate nodes using the incorrect proxy route. As this error message propagates back to the gateways which sent proxy replies, all intermediate nodes will remove their stored proxy route entries. Additionally, the gateways will also become aware of the existence of the destination within the ad hoc network, and will no longer respond to further requests for that destination by sending a proxy reply.

By using tunnelling it is possible to incorporate the default route-concept into on-demand ad hoc routing protocols like AODV and DSR without changing them much. For example, assume that a node knows an Internet gateway. Then the node can search its routing table in the following manner, 1. Look for an entry in the routing table that matches the complete destination IP address. If found, use that route.
2. Invoke the routing protocol to try to find a host route within the ad hoc network by using the route discovery mechanisms. If found, use that route.
3. Otherwise, tunnel the packet to the Internet gateway.

To be capable of tunnelling a packet to the Internet gateway, the node must have a route thereto. If the node does not know any Internet gateway, it considers the destination unreachable instead of tunnelling the packet. The information that there is an Internet gateway available in the ad hoc network can be distributed to the ad hoc nodes in many ways. If the Mobile IP is used, its agent, advertisements can be used. Other ways can be to incorporate a route discovery mechanism into the routing protocol or by using ICMP router advertisements. The tunnelling can be accomplished by either encapsulation or source routing which can be strict or loose. In a preferred embodiment the Mobile IP with foreign agents is used, but this tunnelling procedure can be used in systems not having Mobile IP foreign agents or not using the Mobile IP at all.

When the Internet gateway receives a tunnelled packet from a node in the ad hoc network, it can use all routing information that its ordinary proactive routing protocol has assembled including default and network routes. Nodes in the ad hoc network that only want to communicate with other nodes in the ad hoc network and do not want Internet access do not have to be aware of the Internet, tunnelling, etc. They will only see routes between nodes in the ad hoc network since packets that are destined for hosts outside the ad hoc network are tunnelled to the Internet gateway. No routing information about routes outside the ad hoc network is distributed within the ad hoc network.

The tunnelling procedure described above can, in fact, be used in conjunction with the proxying method described earlier, as it alleviates the need for intermediate nodes to keep any information about the proxy router thus rendering the route error messages mentioned above unnecessary.

Figure 4:
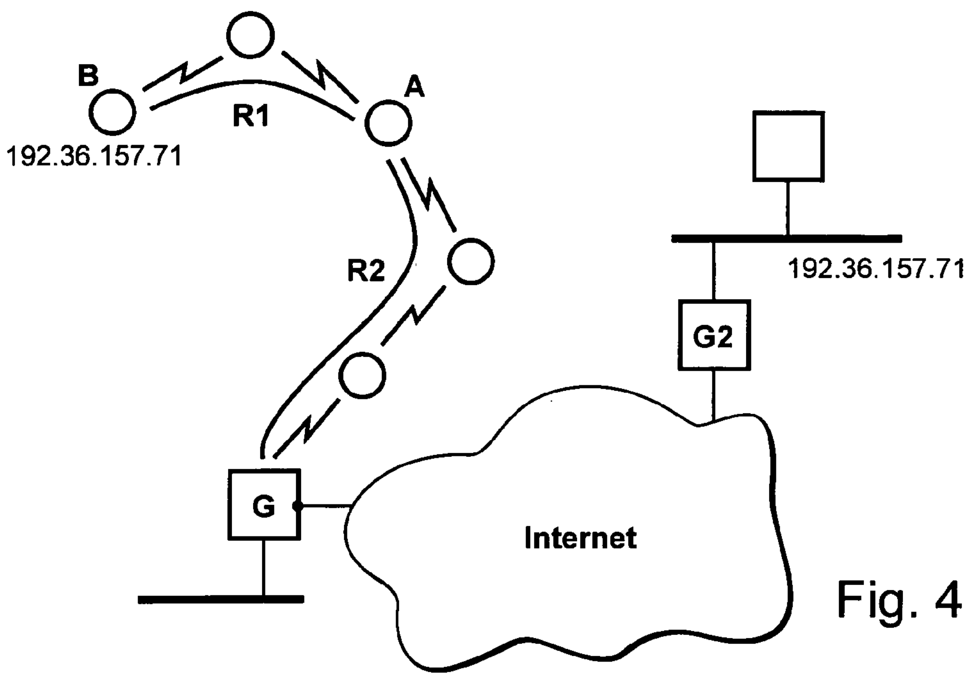
FIG. 4 is a diagram of a Mobile IP Mobile Ad Hoc Network connected to Internet illustrating a situation in which a node can communicate with another node in the network using either a direct connection or an Internet connection using a proxy route.

In the exemplary situation illustrated by the diagram of FIG. 4 node A wants to communicate with node 13. The nodes A and B are both located within the same ad hoc network. If the node A sends a route request in order to find a route to the node B it will receive a route reply from the node B, announcing the route R1. However, the Internet gateway G also has a route to B, since it has a network route via a second gateway G2 to a network that uses the same network ID as the node B. Thus the first gateway G sends a proxy route reply back to the node A announcing the route R2. A problem associated with this situation arises if the nodes along the route R2 store information about the proxy route and decide to start communicating with the node B using the proxy route. This problem can be solved by using the proxying procedure described above or the problem can be avoided by using the tunnelling procedure. In the latter case the intermediate nodes should not set up the proxy route but should instead set up the route to the first gateway G, i.e. a route having the gateway G as the destination instead of the node B as the destination.

Now the situation will be considered in which a node connected to the Internet is trying to reach a mobile node in a Mobile Ad Hoc Network. In order for a node connected to an ad hoc network and having an arbitrary IP address to be reachable from the rest of the Internet, an IP address is needed that allows the node of the ad hoc network to be routable from the rest of the Internet. Since the ad hoc network is connected to the Internet there is at least one node that resides on the border between the ad hoc network and the rest of the Internet, this node being an Internet gateway. The Internet gateway must have at least one IP address that can be used for communication with the rest of the Internet. The Mobile IP with foreign agent care-of addresses can then be used in the gateway.

A foreign agent working according to the Mobile IP can serve several visiting nodes using a single care-of address. A visiting node having an arbitrary home address can attach to any network in the Internet as long as there is a foreign agent that is willing to serve that network. When registered with a foreign agent, a visiting node is routable by its home address. Nodes in an ad hoc network that want access to the Internet can be treated as visiting nodes and they can be allowed to register with a foreign agent.

However, in this solution, according to the Mobile IP, visiting nodes must have link-layer connectivity with their foreign agent. Since link-layer connectivity between a foreign agent and a visiting node cannot always be expected to exist in an ad hoc network, some modifications must be made to the communication between the foreign agent and the visiting node, These changes will be described in more detail below.

One benefit of using foreign agents working according to the Mobile IP is that registered visiting nodes know a gateway to the Internet, i.e. the foreign agent with which they are registered. This allows the use of the tunnelling mechanism described above in the following manner. When a visiting node registers with a foreign agent, it informs according to the routing protocol that it now can tunnel packets out of the ad hoc network. If the registered visiting node cannot find a host using the route discovery mechanism, it should create a host route for the destination in question and store it in its routing table. Using this host route packets are directed to a virtual interface in which they are encapsulated with the foreign agent as the destination IP address, and sent back using the IP to be routed to the foreign agent. A virtual interface is a software driver that appears to be a network interface to upper layers but has not hardware associated with it. For traffic in the other direction, i.e. from the foreign agent to the mobile node, ordinary routing in a Mobile Ad Hoc Network can be performed. Since the route between the foreign agent and the mobile node is contained within the ad hoc network, tunnelling does not have to be used. By using this solution only registered visiting nodes get Internet access; the only traffic that will enter the ad hoc network from the Internet is traffic that is tunnelled to the foreign agent from the home agent of a registered node. The only traffic that will leave the ad hoc network is traffic that is tunnelled to the foreign agent from a registered node.

Figure 5:
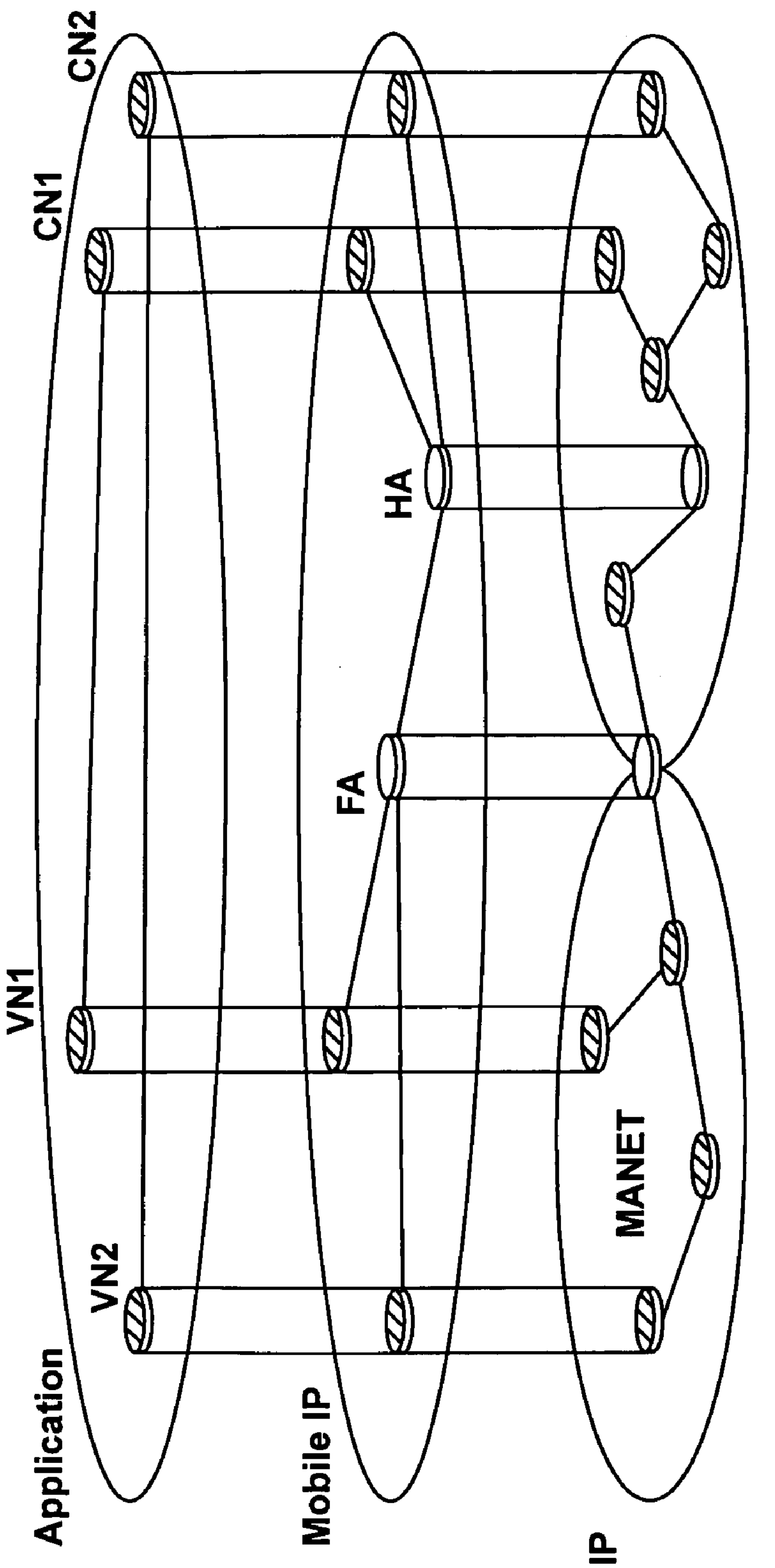
FIG. 5 is a diagram of a Mobile IP Mobile Ad Hoc Network connected to Internet illustrating a foreign agent connected at the border between the ad hoc network and the Internet.

In this method, the mobility provided by the Mobile IP and the mobility provided by the ad hoc routing are very nicely separated. In FIG. 5 an ad hoc network, see the right network at the bottom, having a foreign agent FA at its border is illustrated. There are three registered visiting nodes and two nodes that do not use Mobile IP at all. The routes in the lower layer between all nodes in the network in this particular situation are shown. As can be seen in the figure, the visiting nodes are 1, 3, and 4 hops away from the foreign agent. From the point of view of the Mobile IP the connectivity of interest is between the visiting nodes and the foreign agent. The way in which the routes are formed has no importance.

One of the key features of ad hoc networking is that it allows multihop communication. The Mobile IP, on the other hand, was designed to have the foreign agent and the visiting node on the sane link. When they have link-layer connectivity, packets to the mobile node are forwarded by the foreign agent using its link layer address. In an ad hoc network, the foreign agent and a visiting node might not have link-layer connectivity, but instead have to use multi-hop communications. As now applied to an ad hoc network, the Mobile IP would have to rely on the routing protocol used in the ad hoc network for transporting packets between the foreign agent and a mobile node.

Figure 6:
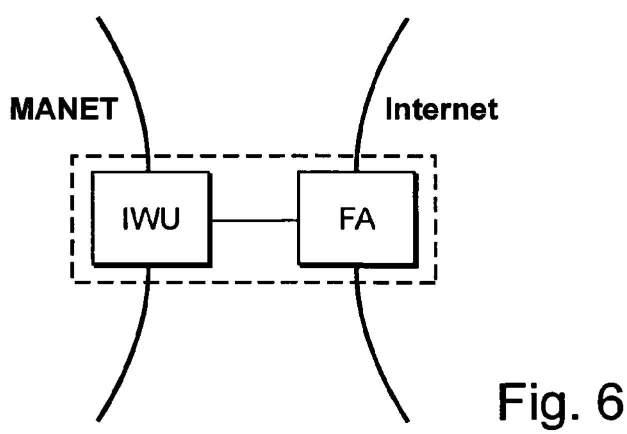
FIG. 6 is a diagram a Mobile IP Mobile Ad Hoc Network Interworking Unit.

In the diagram of FIG. 6 is illustrated the situation in which the ordinary Mobile IP is used in an ad hoc network. It is shown that a foreign agent FA cannot use the link-layer address stored in its visitor list to deliver packets to a visiting node VN. The visiting node changes link-layer connectivity from the node A to the node B. If the ordinary Mobile IP was to be used, the foreign agent would have associated the home address of the visiting node with the link-layer address of the node A. It would therefore have tried to deliver packets to the visiting node VN using the link-layer address of the node A. If, instead, the foreign agent relies on the routing protocol to find a route to the visiting node, packets destined for the visiting node reach the visiting node even though it has switched to have connectivity with the foreign agent through the node B instead of through the node A.

If the route to the visiting node is multihop, an IP address has to be used. This IP address can advantageously be the home address of the visiting node. If the home address is to be used care has to be taken to avoid routing loops since there are two nodes connected to the Internet that want to receive packets sent to a single IP address, the home agent and the mobile node. Instead of reaching the visiting node, packets forwarded by the foreign agent could perhaps be routed to the Internet again and back to the home agent.

To handle these problems modifications to different parts of the Mobile IP that will adapt Mobile IP to mobile ad hoc networks, and enhance its performance in many other situations, can be made as will be described in the following sections.

Thus, it is proposed that foreign agents should broadcast agent advertisements in response to agent solicitations. In this way, the visiting nodes can cooperate to minimize the number of solicitations since one solicitation is sufficient for every node. If there is one foreign agent and two visiting nodes about to solicit, the proposed solution would generate two broadcasts, one solicitation and one advertisement, whereas the unicast approach of the ordinary Mobile IP would generate two broadcasts and two unicasts, two solicitations and two advertisements. The gain in less broadcasts increases with the number of foreign agents and visiting nodes.

To prevent several visiting nodes from broadcasting agent solicitations, they have to wait for a certain amount of time before they are allowed to solicit. This time t depends on their distance, n_hop, from the foreign agent with which they were last registered, and hence nodes that are closer to the foreign agent will solicit before other nodes. The expression for the wait-time is:

$$t=t\_hop*(n\_hop-1+\text{random }(0,0.5))$$

where t_hop is the time that it takes for a packet to traverse one hop and random (0,0.5) is a random number in the interval (0,0.5). A node that hears a solicitation from any other node backs off and awaits an agent advertisement.

In the ordinary Mobile IP, foreign agents broadcast agent advertisements periodically with a beacon period of about one second. When applied to an ad hoc network, this means that the whole network is periodically flooded by messages from the foreign agents. This is a costly operation. As an alternative, instead of periodically broadcasting agent advertisements they can be unicast to registered nodes only. If only a small fraction of the nodes in the ad hoc network are visiting nodes, this will ensure less traffic in the ad hoc network. If the visiting nodes are in majority, it is probably better to use one broadcast instead of multiple unicasts. The Mobile IP Mobile Ad Hoc Network can use either solution.

The foreign agents can also be allowed to select between unicast and broadcast in an adaptive manner in order to keep the overhead as low as possible at all times. One method of doing this is to have the foreign agent periodically unicast agent advertisements to visiting nodes if there are only a few visiting nodes registered with the foreign agent. As the number of registered mobile nodes increases the number of registered nodes will come to a threshold when the foreign agent decides to start sending broadcast agent advertisements. Once a foreign agent starts sending broadcast agent advertisements, it will not revert to sending unicasts until the registrations have expired from so many nodes that the foreign agent considers it better to begin sending unicast instead.

Another variant of the adaptive solution is to make the foreign agent select between unicast and broadcast depending on the ratio between visiting nodes and the total amount of nodes in the ad hoc network. If the ratio is high broadcast should be used, otherwise unicast should be used. The hard part of this solution is to find the total number of nodes in the ad hoc network. A possible solution is to make a qualified guess by estimating the diameter of the network from the number of hops to the visiting nodes.

Another alternative to limit the flooding of the network by advertisements is to set the TTL-field in the IP-header to only a few hops. In this way only mobile nodes that are closer than a certain number of hops to a foreign agent will receive agent advertisements therefrom and will thus also be capable of registering therewith. Nodes that are more hops away than the TTL value used in the agent advertisements will not hear advertisements from the foreign agent. The drawback of this method is that nodes that are not close enough may not find any foreign agents with which to register. However, the method can be easily implemented and can be easily combined with other methods such as the aggregation scheme as described hereinafter.

Now the situation can be considered in which there are several foreign agents in an ad hoc network and each foreign agent periodically broadcasts agent advertisements. Instead of having each node in the network forward each broadcast advertisement, the nodes that receive multiple advertisements are arranged to check the advertisements and make a decision on which advertisement is best and only forward that advertisement. A metric that could be used is the number of hops that the advertisements have travelled. It could be possible to do this by making only the intermediate nodes forward agent advertisements that have traversed fewer hops than every other agent advertisement that was received earlier within a beacon period.

Since a visiting node may be located several hops away from a foreign agent, it cannot determine if a foreign agent is reachable by using link-layer feedback only. It needs to rely on the routing protocol to determine that there is in fact no route to the foreign agent. It is also more difficult to decide between several foreign agents as the quality of the communication with each foreign agent may depend on the quality of many links.

Now a way of deciding the foreign agent which is the better one will be described, this being called a Cell Switching Algorithm, It works as follows:

- If the visiting node is not registered, it selects the foreign agent which has the best metric.
- If the visiting node is registered, it switches to another foreign agent only if the metric of the latter is a predetermined quantity better than the metric of the former foreign agent, for a predetermined number of consecutive agent advertisements.

One example of this Cell Switching Algorithm is to use the hop count to a foreign agent as the metric. The algorithm will then be as follows.

- If the visiting node is not registered, it selects the foreign agent that is the least number of hops away.
- If the visiting node is registered, it switches to another foreign agent only if the latter is a certain number x of hops closer than the former for foreign agent, for y consecutive agent advertisements.

A careful selection of the number x and y can tune the behaviour of this decision mechanism to fit many situations.

Another possibility is to let nodes in the ad hoc network store agent advertisements and use them to respond to agent solicitations instead of forwarding the solicitations. In this way, agent solicitations would not have to traverse all the way to the foreign agent as some intermediate node may have a stored advertisement with which it can respond. This will decrease the response time for the soliciting node and generate less traffic in the network. When the lifetime of an agent advertisement ends, it should of course be discarded.

IP multicast could also be used for Mobile IP related communication like agent advertisements and agent solicitations. Multicast in ad hoc networks is supported by e.g. AODV.

It is possible to dedicate one multicast group to agent solicitations and agent advertisements, and have all visiting nodes and foreign agents listen to that group. In this way solicitations and advertisements will only involve those mobile nodes and foreign agents using the special features of the Mobile IP Mobile Ad Hoc Network as described herein, without disturbing other nodes more than necessary.

To allow the use of the original Mobile IP code in the foreign agents, all new functionality can be provided in an interworking unit IWU that is inserted between the Mobile IP and the ad hoc network as depicted in FIG. 6. The interworking unit permits the use of multihop routing of messages according to the Mobile IP in the ad hoc network. It can be located in either the foreign agent itself, i.e. in the same node, or in a separate host on the same link as the foreign agent. In the latter case the foreign agent does not need any ad hoc routing functionality at all. Prom the point of view of a foreign agent, the interworking unit will look like a visiting node that registers different IP addresses from the same link-layer address.

Every packet that is sent from the foreign agent to the interworking unit is transformed and sent to the ad hoc network depending on the approach which is used. The different approaches described above are handled in the following way by the interworking unit, depending on the cases of agent solicitation or agent advertisements.

In the case of agent solicitation, if replies to agent solicitations are to be made by broadcasting agent advertisements, the interworking unit changes all incoming unicast agent advertisements to broadcast and forwards them to the ad hoc network. Otherwise, if replies to the agent solicitations are to be made by unicasting agent advertisements, the interworking unit must only forward the unmodified advertisements to the ad hoc network.

In the case of periodic agent advertisements, if the periodic agent advertisements are unicast to registered nodes only, the interworking unit ensures that all incoming broadcast agent advertisements are copied and unicast to every registered visiting node. In order for this to work, the interworking unit needs know the nodes which are registered with the foreign agent. If the agent advertisements are periodically broadcast, the interworking unit simply forwards the agent advertisements to the ad hoc network.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A mobile ad hoc network comprising a plurality of nodes including at least one first mobile node and a second node, the at least one first mobile node having a home address and using the home address for communicating with the Internet, the second node acting as a gateway communicating information between the first mobile node and the Internet, wherein IP routing is used, and at least one of the nodes in the mobile ad hoc network comprises means for incorporating default routes and network routes using either tunnelling or proxying, for sending information from the at least one first mobile node to the Internet;

wherein communication using the gateway is initiated by said first mobile node sending a route request, and said second node, that is acting as a gateway, performing the following steps:

in the case of a destination in the ad hoc network, forwarding the request;

in the case of a destination external to the ad hoc network, sending a check to the destination;

after receiving a positive indication from the destination, sending a proxy route reply; and adding a route table entry for the external destination with a sequence number at least equal to a sequence number in the route request;

wherein in the case where a node initiates a route discovering procedure to another node in the network, the network having at least one route to the destination involving a gateway and at least one direct route to the destination; and that nodes intermediate between the node initiating the discovering procedure and the destination node replace an incorrect proxy route with either a better proxy route, if such a route is available, or with a direct route, and will send a, route error message to intermediate nodes using the incorrect proxy route.

2. A mobile ad hoc network comprising a plurality of nodes including at least one first mobile node and a second node, the at least one first mobile node having a home address and using the home address for communicating with the Internet, the second node acting as a gateway for communicating information between the first mobile node and the Internet, wherein IP routing is used, and at least one of the nodes in the mobile ad hoc network comprises means for incorporating default routes and network routes using either tunnelling or proxying, for sending information from the at least one first mobile node to the Internet;

wherein communication using the gateway is initiated by said first mobile node sending a route request, and said second node, that is acting as a gateway, performing the following step:

in the case of a destination in the ad hoc network, forwarding the request;

in the case of a destination external to the ad hoc network, sending a check to the destination;

after receiving a positive indication from the destination, sending a proxy route reply; and adding a route table entry for the external destination with a sequence number at least equal to a sequence number in the route request;

wherein in the case where the route request is sent by a mobile node initiating route discovery and there are a plurality of gateways, each gateway receiving a route reply performs the following steps:

checking if the gateway has a stored route to the destination;

if there is no stored route then accept the route reply;

if there is a stored route, check if the stored route is a proxy route;

if the stored route is a proxy route, check if a route reply sequence number is more recent, else check if the route reply is a proxy reply;

if the route reply is a proxy reply, discard the route reply, else check if the route reply sequence number is more recent;

if the route reply sequence number is more recent, accept the route reply, else check if the route reply sequence number is equivalent to the stored route sequence number;

if the route reply sequence number is equivalent to the stored mute sequence number; check if the route reply hop count is lower than that of the stored route, else discard the route reply;

if the route reply hop count is lower than that of the stored route, accept the route reply.

3. A mobile ad hoc network comprising a plurality of nodes including at least one first mobile node and a second node, the at least one first mobile node having a home address and using the home address for communicating with the Internet, the second node acting as a gateway for communicating information between the first mobile node and the Internet, wherein IP routing is used, and at least one of the nodes in the mobile ad hoc network comprises means for incorporating default routes and network routes using either tunnelling or proxying, for sending information from the at least one first mobile node to the Internet;

wherein each node has a routing table, the node initiating communication by first looking for an entry in its routing table that matches the complete address of the destination and using that address if found;

if no entry was found in the routing table, invoking the routing protocol of the ad hoc network to find a host route within the ad hoc network by using route discovery mechanisms and using that route, if found;

if no route is found then tunnel the packet to the gateway, if a gateway can be found;

if no gateway can be found the consider the destination unreachable.

4. The mobile ad hoc network of claim 3, wherein information that a gateway is available is sent to the at least one node using Mobile IP agent advertisements.

5. The mobile ad hoc network of claim 3, wherein information that a gateway is available is sent to the at least one node using a route discovery mechanism.

6. The mobile ad hoc network of claim 3, wherein information that a gateway is available is sent to the at least one node using ICMP router advertisements.

7. The mobile ad hoc network of claim 3, wherein the tunnelling is accomplished using encapsulation.

8. The mobile ad hoc network of claim 3, wherein the tunnelling is accomplished using source routing.

9. The mobile ad hoc network of claim 8, wherein the source routing is strict.

10. The mobile ad hoc network of claim 8, wherein the source routing is loose.

11. A mobile ad hoc network comprising a plurality of nodes including at east one first mobile node and a second node, the at least one first mobile node having a home address and using the home address for communicating with the Internet, the second node acting as a gateway for communicating information between the first mobile node and the Internet, wherein IP routine is used, and at least one of the nodes in the mobile ad hoc network comprises means for incorporating default routes and network routes using either tunnelling or proxying, for sending information from the at least one first mobile node to the Internet;

wherein the gateway acts as a foreign agent according to Mobile IP, and that means are provided for routine information to the foreign agent by the Mobile IP in order to allow information from hosts on the Internet to be received by the at least one node;

wherein when a node registers as a visiting node with a foreign agent, it informs the network routing protocol that it can tunnel packets out of the ad hoc network;

if the registered visiting node cannot find a host using a route discovery mechanism it creates a host route for the destination and stores it on its routing table;

this host route should direct packets to a virtual interface where they will be encapsulated with the foreign agent as a destination address.

12. The mobile ad hoc network of claim 11, wherein agents periodically broadcast an agent advertisement to all nodes in the network, and when nodes solicit foreign agents, the agents respond by broadcasting an agent advertisement to all the nodes in the network.

13. The mobile ad hoc network of claim 12, wherein the nodes soliciting foreign agents cooperate so that a plurality of visiting nodes will send only one solicitation for the group.

14. The mobile ad hoc network of claim 13, wherein a plurality of nodes are prevented from simultaneously soliciting foreign agents by forcing them to wait a time t before being allowed to solicit the time in particular being equal to t=t_hop*(n_hop−1 +random (0,0.5)), where t_hop is the time that it takes for a packet to traverse one hop and n_hop is the distance, in hops, i.e. the number of hops, between a node and the foreign agent with which it was previously registered.

15. The mobile ad hoc network of claim 11, wherein nodes solicit foreign agents, the agents responding by unicasting an agent advertisement to nodes registered as visiting nodes.

16. The mobile ad hoc network of claim 12, wherein the foreign agent adaptively selects between unicasting and broadcasting advertisements based on the number of nodes registered as visitors to the network.

17. The mobile ad hoc network of claim 16, wherein the foreign agent periodically unicasts agent advertisements while the number of visiting nodes is below a set threshold; when the number of visiting nodes goes above the threshold the foreign agent will begin broadcasting agent advertisements.

18. The mobile ad hoc network of claim 17, wherein the foreign agent reverts to unicasting when a number of agent registrations expires, bringing the total number of agents registered below a second set threshold.

19. The mobile ad hoc network of claim 18, wherein the foreign agent periodically unicasts agent advertisements while the ratio of visiting nodes to total nodes in the network is below a threshold; when the number of visiting nodes exceeds the threshold the foreign agent begins broadcasting agent advertisements.

20. The mobile ad hoc network of claim 19, wherein the ratio is guessed by estimating the diameter of the network using the number of hops to the visiting nodes.

21. A mobile ad hoc network comprising a plurality of nodes including at least one first mobile node and a second node, the at least one first mobile node having a home address and using the home address for communicating with the Internet, the second node acting as a gateway for communicating information between the first mobile node and the Internet, wherein IP routing is used, and at least one of the nodes in the mobile ad hoc network comprises means for incorporating default routes and network routes using either tunnelling or proxying, for sending information from the at least one first mobile node to the Internet;

wherein the gateway acts as a foreign agent according to Mobile IP, and that means are provided for routing information to the foreign agent by the Mobile IP in order to allow information from hosts on the Internet to be received by the at least one node;

wherein the network has a plurality of foreign agents;

in selecting the best agent, a visiting node that is not registered selects the agent which has the best metric;

in selecting the best agent, a visiting node that is registered with a foreign agent, switches to another agent only if the metric of the other agent is a predetermined quantity better than the metric of the agent with which the visiting node is registered and is better for a predetermined number of consecutive agent advertisements.

22. The mobile ad hoc network of claim 21, wherein the metric is the hop count and the metric is better when the hop count is lower.

23. A mobile ad hoc network comprising a plurality of nodes including at least one first mobile node and a second node, the at least one first mobile node having a home address and using the home address for communicating with the Internet, the second node acting as a gateway for communicating information between the first mobile node and the Internet, wherein IP routing is used, and at least one of the nodes in the mobile ad hoc network comprises means for incorporating default routes and network routes using either tunnelling or proxying, for sending information from the at least one first mobile node to the Internet;

where the network has an Interworking Unit (IWU) located between the node using the Mobile IP and the network, to allow the use of multihop routing of Mobile IP messages in the network;

wherein if agent solicitations are to be replied to with broadcast agent advertisements, the IWU changes all incoming agent advertisements to broadcast and forwards them to the ad hoc network, else if the agent solicitations are to be responded to with unicast agent advertisements, the IWU only forwards the unmodified advertisements to the ad hoc network.

24. A mobile ad hoc network comprising a plurality of nodes including at least one first mobile node and a second node, the at least one first mobile node having a home address and using the home address for communicating with the Internet, the second node acting as a gateway for communicating information between the first mobile node and the Internet, wherein IP routing is used, and at least one of the nodes in the mobile ad hoc network comprises means for incorporating default routes and network routes using either tunnelling or proxying, for sending information from the at least one first mobile node to the Internet;

wherein the network has an Interworking Unit (IWU) located between the node using the Mobile IP and the network, to allow the use of multihop routing of Mobile IP messages in the network;

wherein if periodic agent advertisements are unicast to registered nodes only, the IWU ensures that all incoming broadcast agent advertisements are copied and unicast to every registered visiting node, else if periodic agent advertisements are broadcast, the IWU forwards the agent advertisements to the ad hoc network.

25. A computer program product directly loadable into internal memory of a digital computer, comprising software code portions for performing steps of claim 1 when the product is run on a computer.

26. A computer program product stored on a computer usable medium, comprising readable program means for causing a computer to control execution of steps of claim 2.

* * * * *